United States Patent
Israelsson (10) Patent No.: US 6,452,929 B1
(45) Date of Patent: Sep. 17, 2002

(54) NETWORK ARRANGEMENT AND METHOD RELATING TO TELECOMMUNICATIONS

(75) Inventor: Per Israelsson, Täby (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 08/926,620

(22) Filed: Aug. 27, 1997

(51) Int. Cl.[7] ............................. H04L 12/28; H04L 12/56
(52) U.S. Cl. .................... 370/400; 370/395.2; 370/397; 709/238
(58) Field of Search ............................... 370/389, 392, 370/395, 396, 397, 400, 401, 395.2; 709/200, 201, 239, 238

(56) References Cited

U.S. PATENT DOCUMENTS

| | | | | |
|---|---|---|---|---|
| 5,434,852 A | * | 7/1995 | La Porta et al. | 370/385 |
| 5,461,669 A | * | 10/1995 | Vilain | 379/350 |
| 5,509,010 A | * | 4/1996 | La Porta et al. | 370/397 |
| 5,602,840 A | * | 2/1997 | Gunther et al. | 370/385 |

FOREIGN PATENT DOCUMENTS

EP  0496494  7/1992

OTHER PUBLICATIONS

Ido, Nobuhiko et al, International Switching Symposium, "Development of ATM Switching Software Based on Object–Oriented Hierarchical Structure", v.1, p 420–424, (Oct., 1992).

Koyanagi, Keiichi et al., IEEE Global Telecommunications Conf.., Conf. . Record, "Hierarchically Structured Switching Software", p 1918–1922, abstract, (Nov. 1993).

Maruyama, Katsumi, et al., IEEE Communications Magazine, "A Concurrent Objected–Oriented Switching Program in Chill", p 60–68 (Jan. 1991).

Maruyama, Katsumi, et al., Electronics and Communications in Japan Part 1, "Object–Oriented Switching Program Structure", p 26–40, v.75–6, (1992).

Stacey, Jeffrey, et al., IEEE Network Magazine, "Modeling Call Control for Distributed Applications in Telephony", p 14–20, (Nov. 1992).

* cited by examiner

Primary Examiner—Douglas Olms
Assistant Examiner—Bob A. Phunkulh
(74) Attorney, Agent, or Firm—Burns, Doane, Swecker & Mathis, L.L.P.

(57) ABSTRACT

A network arrangement and a method respectively for call processing in a communications system and to a communications system including such network arrangement. The network arrangement in which a call, which here may relate to, e.g., speech, data, video transmission, etc., is to be set up between an originating point and at least one terminating point which are virtually represented by circuits, includes a number of switches which are virtually represented by path objects, and the communication path includes a call part and a connection part. The connection part includes a number of connection objects each including a number of path objects particularly virtually representing switches which are arranged in an object oriented hierarchical structure. At least a number of path objects each include a base path object and a subpath object which are hierarchically arranged in a super class and a subclass, respectively. A base path object can be used by a connection object independently of the corresponding subpath object. The behavior of the subpath object is given by the particular routing case.

20 Claims, 6 Drawing Sheets

NETWORK ARRANGEMENT AND METHOD RELATING TO TELECOMMUNICATIONS

The present invention relates to a network arrangement and a method respectively for call processing in a communications system. The invention also relates to a communications system comprising such network arrangement. Call relates in the present application to any kind of transmission, such as transmission of speech, data, video etc.

In "Diversification and Integration of Networks and Switching Technologies Towards the 21th Century" on the International Switching Symposium 1992, Vol. 1, pp 420–424, development of ATM switching software based on an object-oriented hierarchical structure ATM is discussed. The document relates to an ATM switching system comprising an object-oriented hierarchical software model. The system described therein is based on a structure comprising a number of different layers, objects. A channel layer manages and controls the logical switching equipment which corresponds to the signalling equipment and switches. From a, hierarchically seen, above this layer arranged port layer, differences in methods for implementing switching equipment are concealed by logic resources which are referred to as a channel. The layer conceals differences between the broad band and the narrow-band. Therethrough the layers above the channel layer can be applied both to ATM switching systems and to STM switching systems.

With this structure, ATM as well as STM switches can be used without requiring a changing in the interface for a user. However, in other respects there is no flexibility provided for and the behaviour of a channel can not be changed in any other way without changing the user interface. Furthermore, with this structure it is not possible to, without requiring significant changes thereto, to use for example different switches (or other equipment) apart from those already provided for.

SUMMARY

The present invention relates to a network arrangement for call processing in a communications system and to provide communication between an originating side and at least one terminating side wherein the connection is built up by a connection part and a call part. This means that when an originating side wants to be connected to one or more terminating side(s) a transmission path is ordered. A transmission path here relates to a speech path, a path for data transmission or for video transmission etc. The order is separated into different layers, a call part and a connection part. This is referred to as a call connection separation. In the following, connection relates to the connection part. This comprises a number of connection objects e.g. in turn comprising one or more path objects wherein the objects are arranged in an object-oriented hierarchical structure through which a number of different behaviours incumbent on a path object can be handled. It AS also an object of the invention to provide an arrangement through which the behaviour for a path object can be changed without the user interface having to be changed. Another object of the invention is to provide an arrangement through which the interaction between different routing cases is minimized.

Still another object of the invention is to provide an arrangement which is flexible and which can be used with future arrangements, equipment etc. so that such can be easily connected to the arrangement without the need for changing interfaces etc.

Generally it is an object of the invention to provide an arrangement assisting in providing a good system design, which is flexible and which can be used in a number of different Systems and which is highly efficient in processing calls in a communications system.

It is also an object of the present invention to provide a method for processing calls in a communications system fulfilling the above mentioned objects.

With communications systems are in the present invention meant telecommunications systems in general, telephone communication, data communication, ISDN-communication etc.

These as well as further objects are achieved through an arrangement in which the path objects comprise a base path object and a sub path object which are hierarchically arranged in a super class and a subclass respectively. A connection object can use a base path object independently of the corresponding sub path object. The behaviour of the sub path object is given by the particular routing case. The objects are also achieved through a method wherein the path objects are divided into a base path object and a sub path object wherein a connection object can use a base path object independently of the corresponding sub path object wherein further the behaviour of the sub path object is given by the routing case.

It is an advantage with the invention that the interaction between different objects is low which in turn makes it easy to add new hardware such as for example new and/or different types of switches etc without having to change the interface for the connection object. Another advantage of the invention is that it is easy to change the behaviour of a path object without having to change the interface for a user and in that the behaviour is hidden from the user.

It is also an advantage with the invention that the maintenance of the software is future proof since there is only little interaction between different objects as referred to above. It is also an advantage that all paths can be ordered to connect the transmission path in bothways except from the paths having the access points. (The invention is however, of course, not restricted thereto.) These paths are only setting the transmission path according to the state desired by the user.

With a transmission path is in this document meant e.g. a speech path, data transmission path, video transmission path etc. If for example when discussing a particular embodiment etc. it is merely referred to a speech path, it should be clear that it also may relate to other transmission paths.

BRIEF DESCRIPTION OF THE DRAWINGS

The invention will in the following be described in a non-limiting way under reference to the accompanying drawings in which.

DETAILED DESCRIPTION

The invention will in the following be described in particular under reference to a telecommunications system such as e.g. the AXE-system by Ericsson and some concepts of such a system according to the invention will initially be explained. The invention, however, is of course not limited to a telecommunications system but applies in general to call processing in a communications system, call is here to be interpreted in a broad sense relating not only to telecommunications systems or speech transmission but also to other kinds of transmission, such as of data, video, ISDN etc. The concepts etc. of the telecommunications system which in the following will be defined or explained can of course following this be exchanged through similar concepts etc. in any other appropriate communications system.

When a connection is to be set up between a first subscriber (A) of an originating side and at least one subscriber (B) of a terminating side, a speech path (transmission path) is ordered which order is separated into different layers in an object-oriented structure. This layering is referred to as a call connection separation in which a call is built up by a "call part" and a "connection part".

Figure 1:
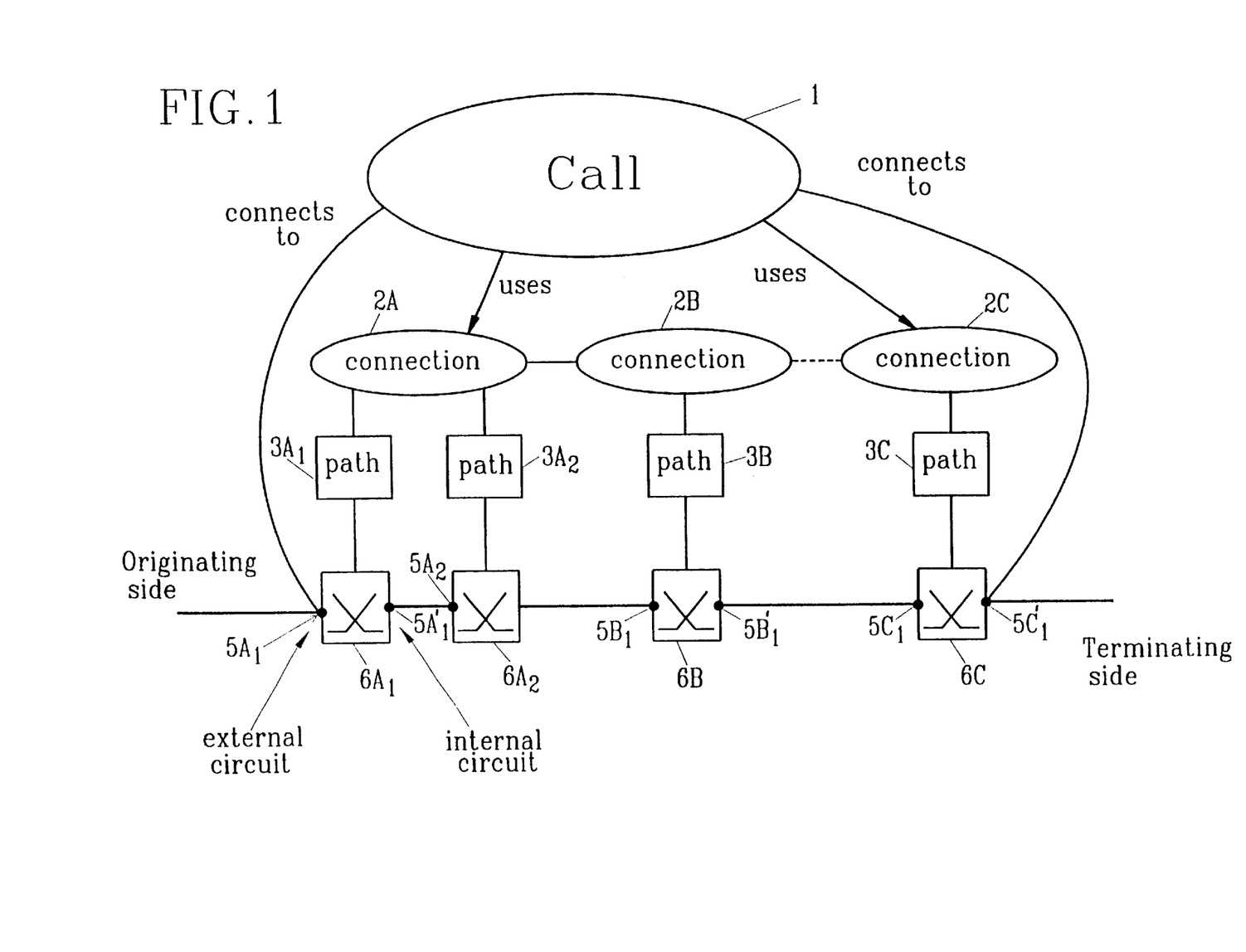
FIG. 1 schematically illustrates a connection between an originating side and a terminating side and the call connection separation, FIG. 2 schematically illustrates the relationship between connection object and physical switches.

This is illustrated in FIG. 1. When thus a speech path is ordered, this order is separated into the call part 1 and the connection part. Call 1 then uses or controls the connection objects 2A, 2B, 2C which are connected to the originating and terminating sides respectively. Each connection object 2A, 2B, 2c comprises one or more path objects $3A_1$, $3A_2$; 3B; 3C which each virtually represent a switch $6A_1$, $6A_2$; 6B; 6C. Access points $5A_1$, $5A_1'$, $5A_2$; $5B_1$, $5B_1'$; $5C_1$, $5C_1'$ are represented by circuits (see definition below) and in FIG. 1 external as well as internal circuits are illustrated.

When thus a subscriber A on the originating side wants to be connected to a subscriber B on the terminating side the call part knows the incoming circuit from A and the outgoing circuit to B. The call part controls the corresponding connection objects and the first (on the originating side) connection object 2A and the intermediate connection objects 2B carry out the routing functions in agreement with the conditions as given by the call part.

In the following description of the invention it will also be referred to a zone concept. A zone is defined as a complete exchange e.g. an AXE exchange which does not depend on any other equipment for its basic functions. The zone is managed via an Operations and Support System (OSS). This zone furthermore constitutes a traffical node within a telecommunications network. This zone is also a dimensioned, configured and installed instance of a generic, AXE network product. A connection instance or a connection object only exists in one and the same zone.

A zone can comprise one or more switches. The switches are internal within the zone and each switch which is used within the zone concerning a specific speech path is controlled by one connection instance which means that a connection object is responsible for a speech path through a zone.

Figure 2:
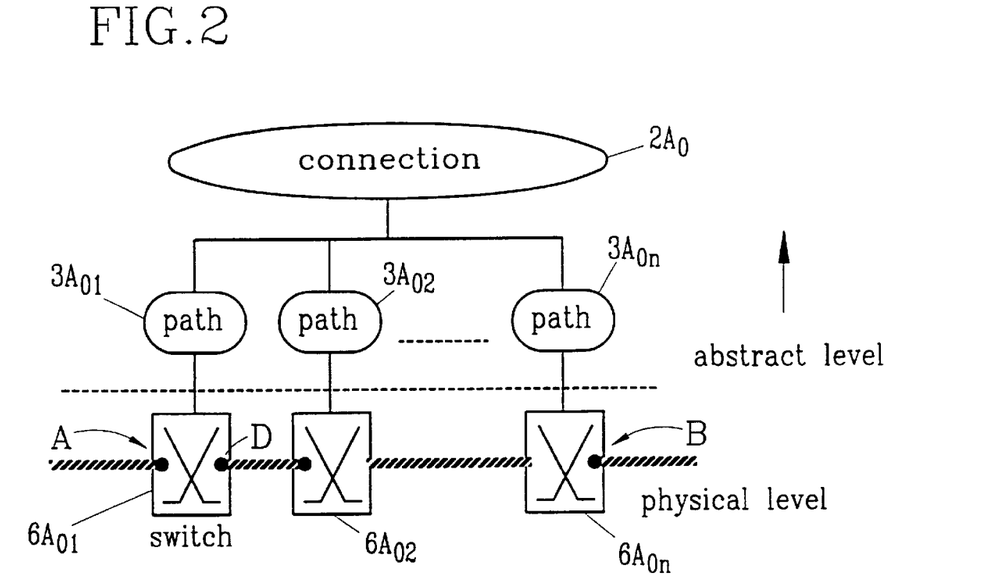

FIG. 2 schematically illustrates the relation between a connection object $2A_o$ and a number of physical switches $6A_{o1}$, $6A_{o2}$, $6A_{on}$. Each physical switch $6A_{o1}$, $6A_{o2}$, ..., $6A_{on}$ is virtually represented by a path object $3A_{o1}$; $3A_{o2}$; $3A_{on}$ and a connection object $2A_o$ comprises a number of path objects $3A_{o1}$; $3A_{o2}$; ... ; $3A_{on}$ and a connection comprises one or more connection objects. A connection object is esponsible for a speech path through a zone. A connection can be set-up between two endpoints in the same switch or through several switches. If just one zone is concerned, only one connection object is needed but if the connection comprises more than one zone, a number of connection objects each built up from one or more path objects are needed.

In order to find the end point of a connection, a routing has to be performed as referred to above. Through the routing procedure, a path is selected from a pool of possible paths. If for example a congestion occurs between two switches, an alternative way can be selected. The routing builds up the connection instance with path instances. The routing procedure is in CCITT (ITU-T) Q.9 defined as "The process of determining and using, in accordance with a set of rules, the route for the transmission of a message or the set-up of a call. The process ends when the message or the call has reached the destination location". A path object controls a speech path through one switch. The path object can order a switch to reserve, connect, disconnect or release a speech path or to get an anchor point, release an anchor point etc. Some switches may separately handle direction, i.e. connect forward, connect backward or connect bothways. In FIG. 2 the access points A and B are defined to be external. The access points are virtually represented by, or named, circuits. A circuit is according to CCITT Q.9. defined as: "A combination of two transmission channels permitting bi-directional communication between two points, to support a single call".

An internal circuit is given from the routing case. External circuits are given by the originating and terminating sides respectively.

For internal circuits the corresponding path objects subscribe to state changes in the internal circuits, e.g. depending on what has happened, different actions are taken.

The point D in FIG. 2 shows an internal circuit. For different routing cases a number of different combinations are possible such as: both circuits being external, one circuit being external whereas one circuit is an internal circuit with an intra zone via, one circuit is external and is going out from the zone towards the next zone, both circuits are internal circuits not going out from the zone or both circuits are internal circuits but one goes out from the zone towards another zone.

All the different routing cases give paths with different behaviours (see FIG. 2). All external circuits are for example given by the user of the connection objects. These circuits can not be controlled by the connection object. All internal circuits are fetched by the connection object assisted by the result of the routing. These internal circuits are marked as busy by the connection object to prevent other connections from using the circuits. When a speech path is released, the connection object is responsible for setting the circuits free. The circuit is than marked "free" and another path object can use it.

The handover concept, i.e. changing one endpoint for another, will be discussed later on.

According to the invention; a path object comprises two parts with the use of an object orientation approach. The first part is called a base path object which is used by the connection object or the user. The other part is denoted a sub path object. The behaviour is comprised in the sub path object which further inherits the properties of the base path object.

The invention relates to the handling of all different types of behaviour that the path object has to take care of. The connection object as referred to above, merely takes care of the Connection through one zone and the path object itself takes care of the behaviour which is typical for that particular path and switch element.

Figure 3:
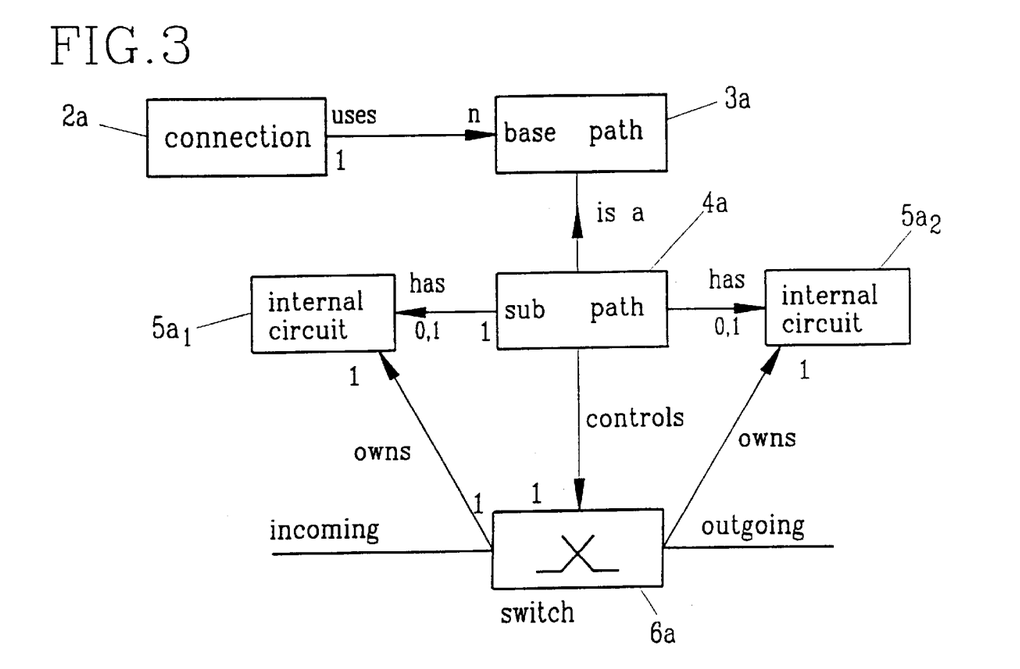
FIG. 3 illustrates schematically the basic principle of the invention.

According to the invention the base path (object) is used by the connection object independently of the sub path (object). The connection object can order reserve backward, connect bothways etc. This order is sent in the same way as discussed above from the connection object to the base path without any knowledge of the behaviour of the sub path object. For each routing case a specialized path is assigned. Thus, when a connection is set-up between a first subscriber A and at least one second subscriber B which comprises a number of path objects, the behaviour of the path object is given by the order of the path object on the link or on the connection. For each path object, the connection object uses the base object whereas the behaviour is specialized in the sub path object which also is connected to the system. Each connection object uses a base object without knowing (for example) which hardware is controlled by the sub path object. The principle of the invention is illustrated in FIG. 3. A connection object $2a$ uses or may have between one and n (wherein n is any number between one and infinity) path objects or rather base path objects $3a$. One base path $3a$ here has one connection object $2a$. A sub path object $4a$ may have 0,1 or 2 circuits $5a_1$, $5a_2$ whereas one internal circuit has one sub path $4a$. One circuit connects to a switch and one sub path $4a$ always controls one switch $6a$. In the figures connection means connection object, base path means base path object etc.

For each routing case a specialized path is assigned, i.e. a base path object. A few examples will be illustrated under reference to FIGS. 4–7. As referred to above, the behaviour of the path object (comprising a base path object and a sub path object) depends on the location on the connection link, i.e. on the routing. It may also depend on the corresponding. switch or switching equipment.

Figure 4:
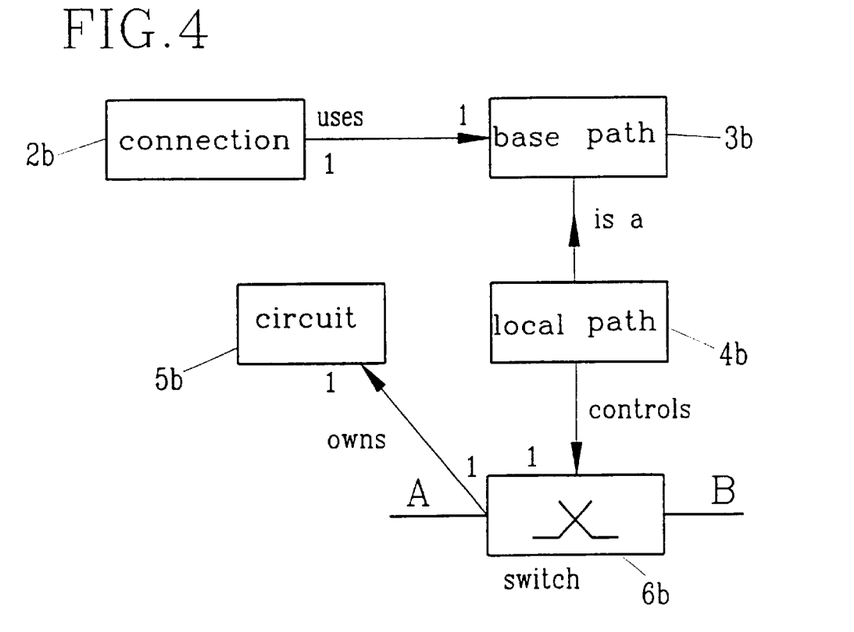
FIG. 4 illustrates a first routing case.

FIG. 4 illustrates an example in which the routing case points out an end of selection at the first routing attempt. The sub path object is in the shown embodiment denoted a local path object $4b$. The behaviour of the local path object $4b$, as given by the routing, is that no information is hidden for the user. All orders are transparently sent down to the switch $6b$ (if orders forward or backward) and there are no internal circuits but merely external circuits. As can be seen from the figure, the connection object $2b$ uses one base path object $3b$ and the local path object $4b$ controls one switch $6b$. The local path object $4b$ further has no circuit and the circuit $5b$ is connected to one switch $6b$ or is owned by one switch $6b$.

Figure 5:
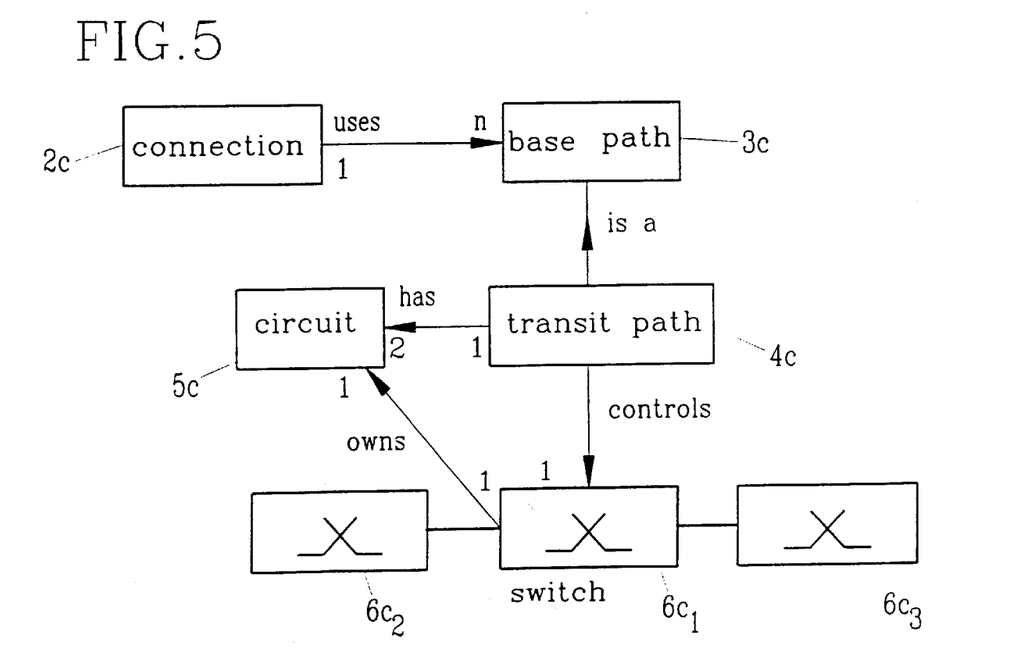
FIG. 5 illustrates the application of the invention to a second routing case.

If the routing case points out a path object with internal circuits and these are not going out from the zone, then the sub path object is denoted a transit path object $4c$. This is illustrated in FIG. 5. The behaviour of this object is that the circuits are internal. The path object $4c$ subscribes to state changes for the two internal circuits $5c$ and then the transit path object $4c$ gets states changes on both. This is done to get information about if a circuit has been broken, a hardware failure or if an operator has taking the circuit out of traffic etc. The transit path object $4c$ furthermore releases the circuits when a release order has been sent from the connection object $2c$. If a failure occurs or if the process goes down, the transit path object $4c$ releases the circuit $5c$ or circuits in a controlled manner. The transit path object $4c$ is never involved in a handover. At creation the transit path object $4c$ can be ordered to connect the speech path bothways independently of the orders of the user. This is done in order to minimize the number of operations according to the CCITT signalling system number 7. Thus, generally the transit path object $4c$ handles connections into the switch, switches $6c_1$, $6c_2$, $6c_3$, etc. Bothways connection is however not necessary but relates to an advantageous way of carrying out the invention.

Figure 7:
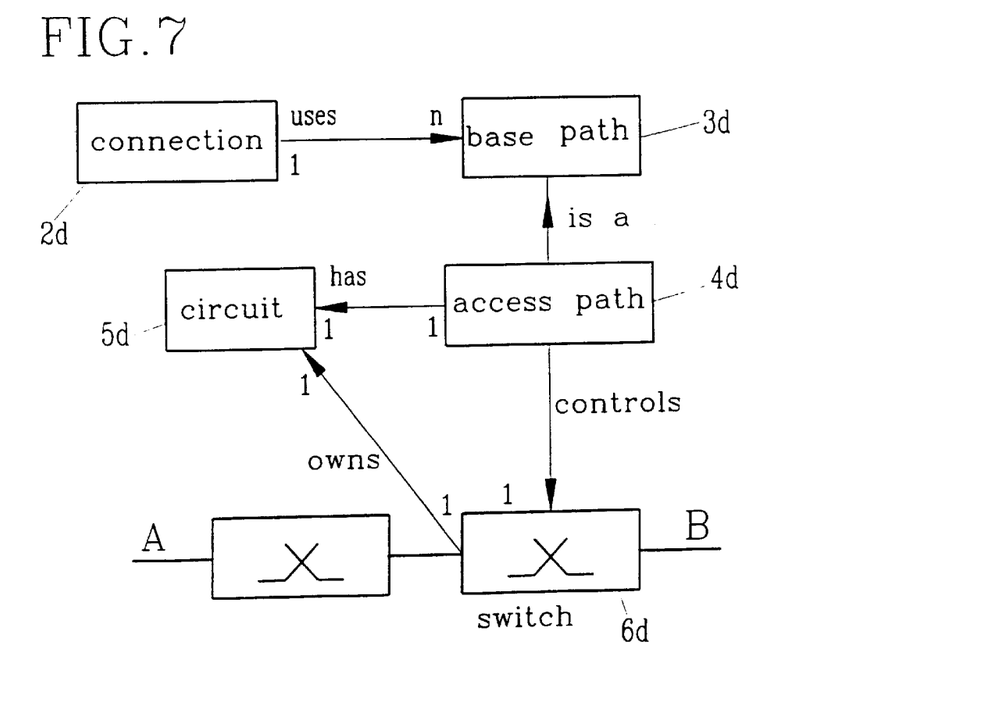
FIG. 7 illustrates a fourth routing case comprising an access path object, FIG. 8 schematically illustrates a handover within a zone, FIG. 9 schematically illustrates a handover when the speech path goes through to more than one zone.

If the first routing case is not an end of selection or a going out from the zone, the sub path object is called an access path object $4d$. This is illustrated in FIG. 7. An access path object is also selected if a routing has been performed before an end of selection is found in the next routing. As can be seen from the figure the connection object $2d$ uses 1 to n base path objects $3d$, the sub path object or the access path object $4d$ has one circuit $5d$ which in turn is owned by the switch $6d$. The behaviour of the access path object $4d$ is thus that one of the circuits is internal. The state of this object reflects the state of the user of the connection. If the user orders connect forward, the access path object $4d$ orders the switch $6d$ to connect forward. The access path object $4d$ thus only handles one circuit $5d$, the others depend on the connection. The object can therefore only be connected in one point.

Figure 6:
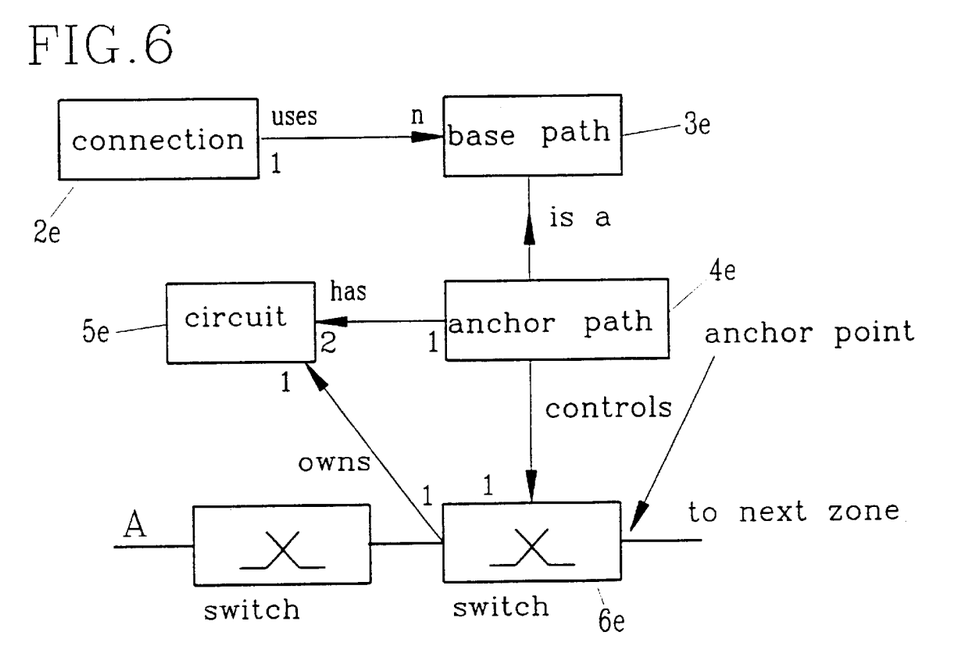
FIG. 6 illustrates the application of the invention to a third routing case.

If a routing is not a first routing, i.e. if a routing is been done before, and the next routing is going out from the zone or if coming to the last zone and the routing does not get an end of selection, the sub path object is denoted an anchor path object $4e$ (see FIG. 6). The behaviour of this object is that it has both the circuits $5e$, i.e. they are internal but one of the circuits is an anchor point. The circuit $5d$ is owned by the switch $6e$. (Anchor points and handover etc. will be explained under reference to FIGS. 8 and 9 below.) Upon creation of the anchor path object $4e$, the speech path can e.g. be set to connect bothways but this is not necessarily the case. The anchor path object $4e$ subscribes to state changes of the circuits as already discussed. If there is a hardware failure for one of the circuits, the other circuit is released and the connection is released. If the connection object $2e$ is ordered to release, the path object only releases the circuit which is not an anchor point. After a release the connection object $2e$ can order this object to release the anchor point or if a handover has been done, the anchor path object is deleted without releasing the anchor point circuit.

If a first routing case points out that the speech path goes out from the zone or if it is arrived at the subsequent or the following zone and an end of selection is obtained, then the sub path object is denoted an access and anchor path object (not shown in the figure). The behaviour of such an object is that it (the access and anchor path object) owns one of the circuits (i.e. an internal circuit) and that this circuit is an anchor point. The anchor point can not be released in the same way as a common internal ("owned") circuit. This circuit can be used by two different connections. At creation, the access and anchor path object subscribes to state changes for the internal circuit as referred to above. At release of a connection, the anchor point circuit is not released. To release the circuit, the connection object which knows that it must be an anchor point orders the end point to release its circuit.

Figure 8:
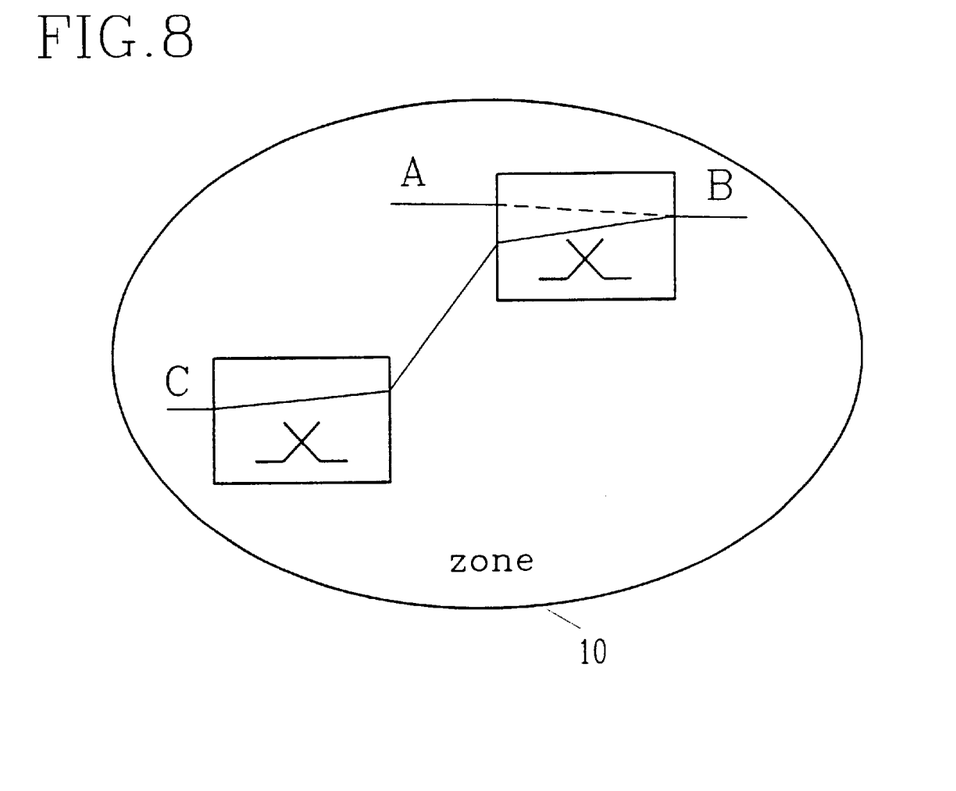
Figure 9:
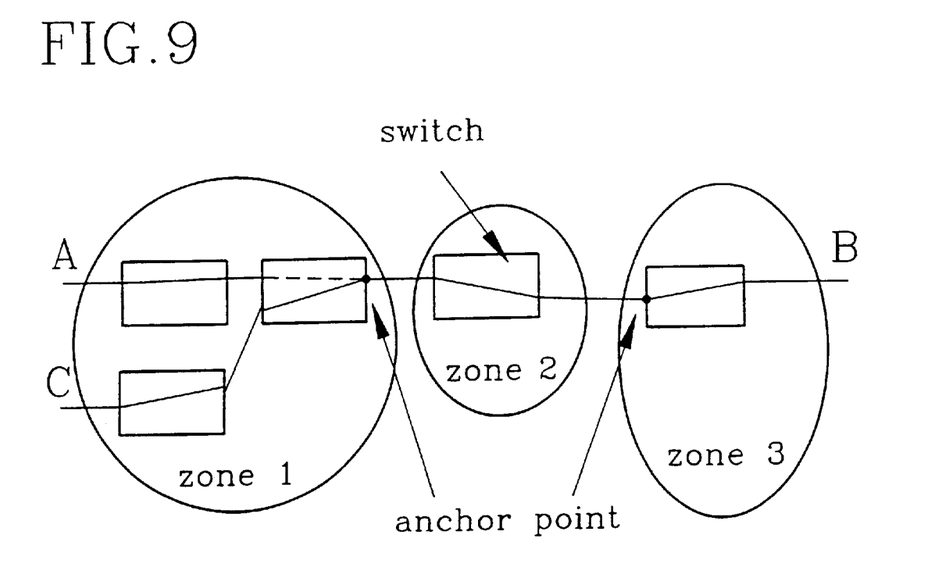

Under reference to FIGS. 8 and 9 the changing of end point i.e. the handover concept as applied above will be briefly discussed for explanatory reasons. If a connection originates and terminates in one and the same zone 10, than the connection object must after a handover have its originating and terminating point in one and the same zone. If, see FIG. 8, point A is changed to C, then C must be in the same zone as A.

A handover only operates on one circuit at the time and if a speech path goes through two or more zones, then an anchor point is defined as a point from which a new connection should be routed (see FIG. 9). This anchor point is the incoming/outgoing circuit to/from the zone. A handover is done from point A to point C. In general only external circuits can be changed.

Figure 10:
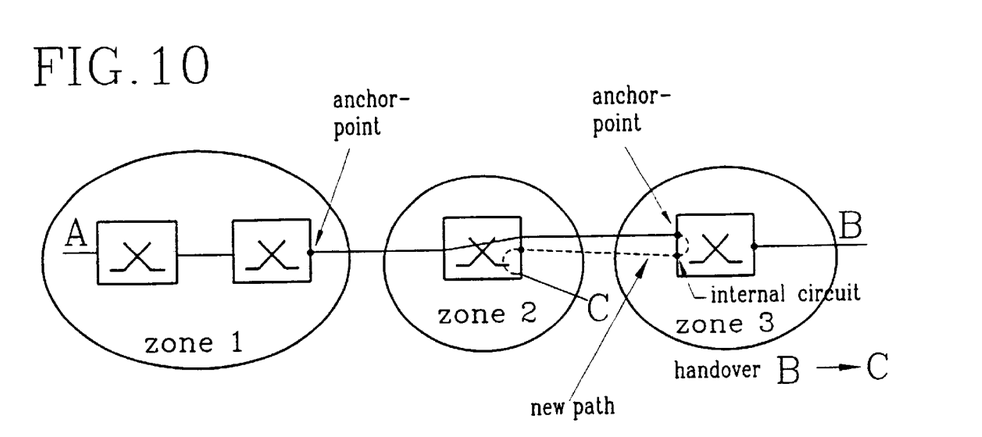
FIG. 10 illustrates a handover from one zone to another zone and FIG. 11 schematically illustrates the connection of equipment.

FIG. 10 illustrates the case when a handover is done from B in zone 3 to C in zone 2. A sub path object in zone 2 has two internal circuits. This sub path object can be released directly, and the circuit will then be released directly. The anchor point in zone 3 is kept, but the ingoing internal circuit to point d in zone 2 will not be an anchor print. For reasons of clarity a line is drawn through the switch of zone 2.

Through the invention it is possible to change the behaviour of a path object without changing the interface for a connection object. The behaviour is hidden from the user. All paths can be ordered to connect the speech path bothways (although this is not necessary; it still falls within the intention) except for the paths having the access points. These paths only set the speech path according to the state desired by the user.

Figure 11:
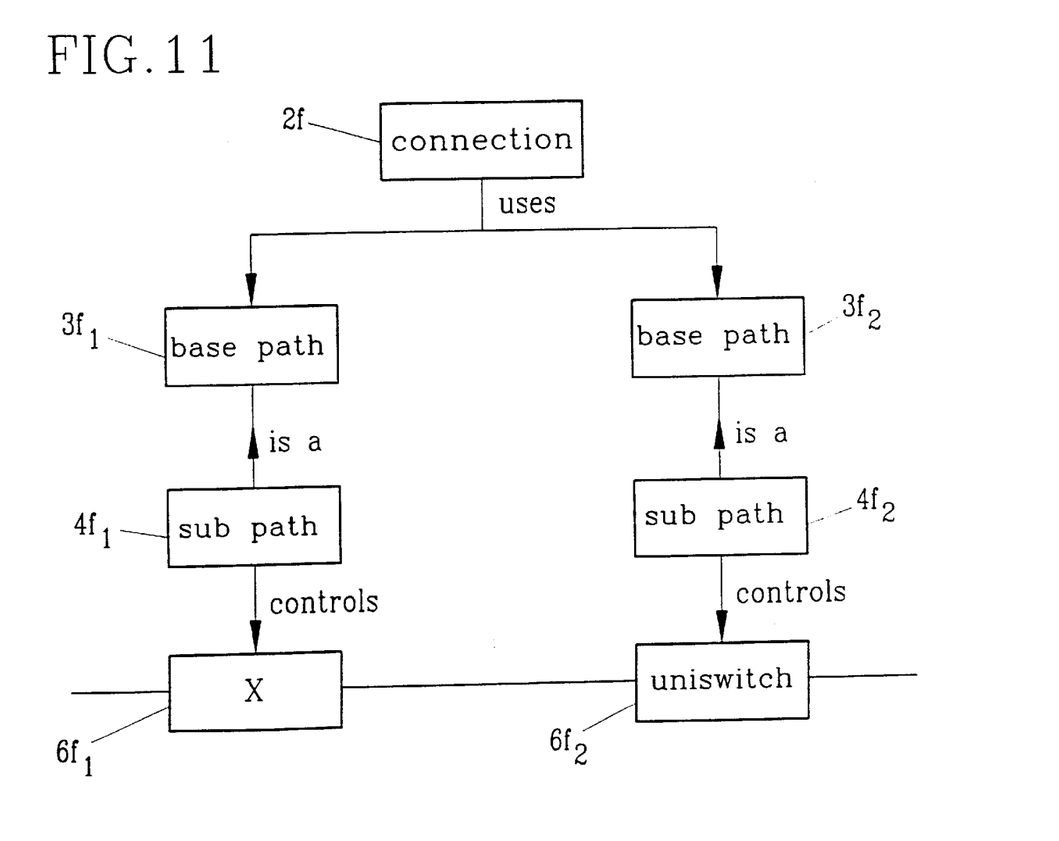

FIG. 11 very schematically illustrates the addition or connection of for example new hardware such as different or new types of switches $6f_1$, $6f_2$ (e.g. a uniswitch or some other switch x) etc. without having to change the interface for the connection object $2f$ which is enabled through the present invention, wherein the connection object $2f$ uses base path objects $3f_1$, $3f_2$ and the sub path objects $4f_1$, $4f_2$ control the new hardware $6f_1$, $6f_2$.

The invention is not limited to a telecommunications system but can, as referred to above, be used with other communication or transmission systems as well. Moreover the invention can be applied in a number of different ways other than those which have been described in the detailed description and thus also other behaviours are possible and can be defined for or assigned to the path objects.

I claim:

1. A network arrangement for call processing in a communications system in which a call is to be set up via a transmission path between an originating point and at least one terminating point, each virtually represented by a circuit, the system including a number of switches virtually represented by path objects, the network arrangement comprising:

a call part and a connection part, each representing a layer in the transmission path, the call part controlling the connection part, the connection part including a number of connection objects, each comprising a number of path objects, wherein the connection objects and path objects are arranged in an object-oriented hierarchical structure; at least a number of the path objects each comprise a base path object and a sub path object that are hierarchically arranged in a superclass and a subclass respectively; the base path object can be used by a respective connection object independently of the corresponding sub path object; and a behavior of the sub path object is given by a routing case.

2. The network arrangement of claim 1, wherein the behavior of a sub path object further is given by the switches.

3. The network arrangement of claim 1, wherein a specialized sub path object is assigned for each routing case and/or switch.

4. The network arrangement of claim 3, wherein when the routing case indicates an end of selection at a first routing attempt, the sub path object comprises a local path object and a circuit representing a switch is transparently controlled through the local path object.

5. The network arrangement of claim 4, wherein for the local path object does not have internal circuits.

6. The network arrangement of claim 1, wherein when circuits representing access points are internal circuits of the same zone, the sub path object is a transit path object.

7. The network arrangement of claim 6, wherein the respective connection object controls the transit path object to connect a speech transmission path both ways independently of orders given by a user.

8. The network arrangement of claim 1, wherein if a first routing does not involve an end of selection or a leaving of the zone from which the selection originates, the sub path object is defined as an access path object.

9. The network arrangement of claim 1, wherein when a routing is performed before an end of selection of a subsequent routing has been found, the sub path object is an access path object.

10. The network arrangement of claim 8, wherein at least one of the circuits representing an access point is an internal circuit.

11. The network arrangement of claim 8, wherein the access path object only sets the speech path according to a state given by the user.

12. The network arrangement of claim 1, wherein when a routing is not a first routing and when the routing results in a leaving of a zone, the sub path object comprises an anchor path object.

13. The network arrangement of claim 1, wherein when a routing is not a first routing and the routing results in coming to the last zone, but no end of selection is provided, the sub path object comprises an anchor path object.

14. The network arrangement of claim 12, wherein an anchor path object owns both circuits representing access points, one of which is an anchor point.

15. The network arrangement of claim 14, wherein an anchor path object only releases the circuit which does not represent an anchor point when it receives a first release order.

16. The network arrangement of claim 1, wherein if a first routing case indicates that a speech path leaves the zone, the sub path object comprises an access and anchor path.

17. The network arrangement of claim 1, wherein if a first routing case indicates that the speech path goes to a subsequent zone and an end of selection is reached, the sub path object is defined as an access and anchor path object.

18. The network arrangement of claim 16, wherein one of the circuits of an access and anchor path object representing an access point is internal and an anchor point which can be used by two different connections.

19. A connection part in a network arrangement in a communications system having a number of originating points and a number of terminating points, in which, for providing communication between an originating point and at least one terminating point, a transmission path is ordered, which order is separated into a call part and a connection part which is controlled by the call part, the connection part comprising:

a number of connection objects each using at least one path object each representing a switch, and each path object comprising a base path object and a sub path object;

wherein the connection objects and path objects are arranged in an object-oriented hierarchical structure, each connection object can use a base path object independently of the corresponding sub path object, and the behavior of the sub path object is given by a routing case.

20. A method for providing communication between an originating point and at least one terminating point in a communications network based on an object-oriented structure, comprising the steps of:

ordering a transmission path from the originating point to the at least one terminating point, and separating the order into a call part and a connection part, the connection part comprising a number of connection objects, wherein each connection object uses at least one path object representing a switch, each path object comprising a base path object and a sub path object, the connection objects carry out a consecutive routing analysis and decision procedure using the base path objects independently of the corresponding sub path object, and a behavior of the sub path object is given by the particular routing case.

* * * * *